(12) United States Patent
Bos (10) Patent No.: US 6,757,109 B2
(45) Date of Patent: Jun. 29, 2004

(54) PLASTIC LENS SYSTEM FOR VEHICLE IMAGING SYSTEM

(75) Inventor: Brent J. Bos, Tucson, AZ (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 10/010,862

(22) Filed: Dec. 6, 2001

(65) Prior Publication Data

US 2002/0048086 A1 Apr. 25, 2002

Related U.S. Application Data

(60) Continuation-in-part of application No. 09/767,939, filed on Jan. 23, 2001, now Pat. No. 6,590,719, which is a division of application No. 09/361,814, filed on Jul. 27, 1999, now Pat. No. 6,201,642.
(60) Provisional application No. 60/254,373, filed on Dec. 8, 2000.

(51) Int. Cl.$^7$ ............................................. G02B 13/04
(52) U.S. Cl. ....................... 359/753; 359/742; 348/118
(58) Field of Search ................................. 348/113, 118, 348/148; 359/742, 743, 749–753, 771–795

(56) References Cited

U.S. PATENT DOCUMENTS

| | | | |
|---|---|---|---|
| 3,947,095 A | 3/1976 | Moultrie | 350/302 |
| 4,214,266 A | 7/1980 | Myers | 358/108 |
| 4,277,804 A | 7/1981 | Robison | 358/108 |

(List continued on next page.)

FOREIGN PATENT DOCUMENTS

| | | | |
|---|---|---|---|
| DE | 2931368 A1 | 2/1981 | |
| DE | 3248511 A1 | 7/1984 | |
| EP | 0416222 A2 | 3/1991 | |
| EP | 0513476 A1 | 11/1992 | |
| EP | 1004916 A1 | 5/2000 | |
| FR | 2241085 | 4/1973 | |
| FR | 2585991 | 2/1987 | |
| FR | 2673499 | 9/1992 | |
| GB | 934037 | 8/1963 | 358/108 |
| GB | 2137573 A | 10/1984 | |
| GB | 2244187 A | 11/1991 | |
| GB | 2327823 A | 2/1999 | |
| JP | 55039843 | 3/1980 | 358/103 |
| JP | 58209635 | 12/1983 | |
| JP | 62122487 | 6/1987 | |
| JP | 62122844 | 6/1987 | 358/108 |
| JP | 30061192 | 3/1991 | |
| JP | 50000638 | 1/1993 | |
| WO | 9638319 | 12/1996 | |

OTHER PUBLICATIONS

Commonly assigned, co–pending U.S. patent application, Ser. No. 09/199,907, filed Nov. 25, 1998, by Bos et al., entitled Wide Angle Image Capture System for Vehicle. (DON01 P–676).

(List continued on next page.)

*Primary Examiner*—Mark A. Robinson
*Assistant Examiner*—Alessandro Amari
(74) *Attorney, Agent, or Firm*—Van Dyke, Gardner, Linn & Burkhart, LLP (57) ABSTRACT

An optical or lens system for use with an imaging system of a vehicle includes a plurality of optical elements. The optical elements include less than five optical elements and, preferably, include four optical elements. Each of the optical elements is formed of a plastic material. At least two of the optical elements include a diffractive element. Preferably, a diffractive element is formed on an outer surface of two of the optical elements. The optical system provides and focuses a field of view of a targeted area of at least approximately 100 degrees to an imaging plane. The imaging plane is at an imaging sensor or camera or other imaging device operable to receive the image from the optical system. The optical system further includes an aperture stop between two of the optical elements.

28 Claims, 2 Drawing Sheets

U.S. PATENT DOCUMENTS

| | | | | |
|---|---|---|---|---|
| 4,381,888 A | | 5/1983 | Momiyama | 350/458 |
| 4,626,850 A | | 12/1986 | Chey | 340/903 |
| 4,647,161 A | | 3/1987 | Mullerü | 350/462 |
| 4,892,345 A | | 1/1990 | Rachael, III | 296/24.1 |
| 4,895,790 A | | 1/1990 | Swanson et al. | 430/321 |
| 4,937,796 A | | 6/1990 | Tendler | 367/116 |
| 5,016,977 A | | 5/1991 | Baude et al. | 350/162.17 |
| 5,044,706 A | * | 9/1991 | Chen | 359/357 |
| 5,121,200 A | | 6/1992 | Choi | 358/103 |
| 5,208,701 A | | 5/1993 | Maeda | 359/574 |
| 5,406,395 A | | 4/1995 | Wilson et al. | 359/15 |
| 5,414,461 A | | 5/1995 | Kishi et al. | 348/115 |
| 5,550,677 A | | 8/1996 | Schofield et al. | 359/604 |
| 5,574,443 A | | 11/1996 | Hsieh | 340/901 |
| 5,648,835 A | | 7/1997 | Uzawa | 396/429 |
| 5,670,935 A | | 9/1997 | Schofield et al. | 340/461 |
| 5,760,826 A | | 6/1998 | Nayar | 348/36 |
| 5,760,828 A | | 6/1998 | Cortes | 348/143 |
| 5,796,094 A | | 8/1998 | Schofield et al. | 250/208.1 |
| 5,949,331 A | | 9/1999 | Schofield et al. | 340/461 |
| 6,018,425 A | * | 1/2000 | Nakabayashi et al. | 359/753 |
| 6,028,711 A | * | 2/2000 | Adachi | 359/642 |
| 6,201,642 B1 | | 3/2001 | Bos | 359/565 |

OTHER PUBLICATIONS

Commonly assigned, co-pending U.S. patent application, Ser. No. 09/493,522, filed Jan. 28, 2000 by Applicants Brent J. Bos et al. (DON01-P-788).

Commonly assigned, co-pending U.S. patent application, Ser. No. 09/799,993, entitled Elliptical Aperture, filed Mar. 6, 2001 by Applicant Brent J. Bos. (DON01 P-877).

U.S. Publication No. 2002/0003571, published Jan. 10, 2002 for commonly assigned, co-pending U.S. patent application, Ser. No. 09/793,002, entitled Video Mirror Systems Incorporating an Accessory Module, filed Feb. 26, 2001 by Kenneth Schofield et al. (DON01 P-869).

Commonly assigned, co-pending U.S. patent application, Ser. No. 09/817,874, entitled Interactive Automotive Rearvision System, filed Mar. 26, 2001 by Applicants Chad D. Quist et al. (DON01 P-889).

U.S. Publication No. US-2001-0013973A1, published Aug. 16, 2001, for commonly assigned, co-pending U.S. patent application, Ser. No. 09/676,939, entitled Wide Angle Imaging System, filed Jan. 23, 2001 by Applicants Brent J. Bos. (DON08 P-871).

* cited by examiner

PLASTIC LENS SYSTEM FOR VEHICLE IMAGING SYSTEM

CROSS REFERENCE TO RELATED APPLICATIONS

This application claims priority on U.S. provisional application, Ser. No. 60/254,373, filed Dec. 8, 2000 for MODERATE FIELD PLASTIC LENS, and is a continuation-in-part of U.S. patent application, Ser. No. 09/767,939, filed Jan. 23, 2001 by Brent J. Bos for WIDE ANGLE IMAGING SYSTEM, now U.S. Pat. No. 6.590, 719, which is a division of U.S. patent application, Ser. No. 09/361,814, filed Jul. 27, 1999, now U.S. Pat. No. 6,201, 642, which are all hereby incorporated herein by reference in their entireties.

FIELD OF THE INVENTION

The present invention relates generally to vehicular imaging systems and, more particularly, to a plastic lens or optical system which provides a wide angle field of view to an imaging device of a vehicular vision system.

BACKGROUND OF THE INVENTION

Various vision systems have been proposed to enhance the view of a driver or operator of a vehicle. More particularly, vehicle vision systems, such as rear-view systems, are desired to provide an operator of a vehicle with wide angle scenic information of an area around the vehicle, such as directly rearward of the vehicle, when the vehicle is traveling in reverse. Neither interior rear-view mirrors nor side exterior mirrors allow for visibility of the area immediately rearward of the vehicle's bumper, which is the information most critical to the vehicle operator when backing up. Therefore, various camera-based rearview vision systems have been proposed to provide visibility of this blind spot.

An example of such a proposed system includes a camera with a conventional, standard lens which is located on the rearward portion of the vehicle to provide a view of the area behind the vehicle. However, a standard lens fails to capture a wide angle view of the area, thus failing to provide the vehicle operator with an image of the entire critical area directly rearward of the vehicle.

In order to provide a wider angle view of the rearward area, a wide angle lens system may be used with the camera to capture the critical area. However, because the wide angle lens elements are typically precision optics, not only is the initial cost to manufacture and implement such a lens very high, but so is the cost to replace the lens, should it be damaged or broken on the vehicle in the vulnerable area in which it is typically located.

Another difficulty with the proposed multi-element glass lens and camera systems is that they are difficult to package within the small area available at the rearward portion of the vehicle. Such a system may comprise ten or more precision optic lens elements and is thus assembled as a long, horizontally oriented cylindrical column, which is then positioned within the trunk lid or a rear panel of the vehicle. This results in the camera system protruding substantially forwardly into the trunk space. Generally, it is desirable to minimize intrusion into the trunk space, such that the overall trunk space is maximized. This is desirable not only because trunk space is considered valuable to consumers, but also because consumers tend to over-pack their trunk spaces, and then force the trunk lid closed, which may result in damage to any components trapped between the packed items and the trunk lid. This is an even greater concern with the proposed multi-element glass lens systems, since the many optic elements may be fragile and thus prone to breaking. In a van, pick-up truck or the like, the long, cylindrical column of such a camera system would extend forward into an open space, and be more prone to damage.

SUMMARY OF THE INVENTION

The present invention provides a lens system which is adapted to provide a moderate to wide angle field of view for a vehicular imaging system, such as a vehicular video camera system or the like. More specifically, the lens system is adapted to provide a moderate to wide angle field of view of an area forwardly, rearwardly, adjacently, exteriorly and/or interiorly of a vehicle or a compartment of the vehicle. The lens system comprises a plurality of plastic optical elements consisting of at least two plastic optic elements, but no more than four plastic optic elements and, thus, is smaller and less expensive to manufacture then the multi-element precision optic lenses of the prior art.

According to one aspect of the present invention, an optical system for use with an imaging system of a vehicle includes a plurality of optical elements. The plurality of optical elements comprises less than five optical elements. Each of the plurality of optical elements comprises a plastic material. At least two of the optical elements include a diffractive element. The optical system provides a field of view of at least approximately 100 degrees to an imaging plane.

Preferably, one surface of two of said plurality of optical elements includes a diffractive element. Preferably, a surface of each of a pair of adjacent optical elements includes the diffractive elements. The diffractive elements are preferably at the surfaces of the pair of optical elements which face toward the scene being focused by the optical system. Preferably, the outer optical element has a clear aperture diameter of less than approximately 15 mm.

Optionally, the optical system provides the field of view to a sensor of an imaging system positioned at the image plane. The sensor is operable to receive the field of view from the optical system. The optical system may be implemented with at least one of a vehicular vision system for providing scenic information of an area exteriorly of a vehicle to an occupant of the vehicle, a rain sensor, a headlamp control, a backup camera, a stereo imaging system, a lane change aid camera for monitoring a side lane of the vehicle, a blind spot monitoring sensor for monitoring a blind spot at a side lane adjacent to the side of the vehicle, a forward facing lane marker detection system for monitoring or detecting the lane markers on a road to assist in keeping the vehicle traveling within the lane, and an interior monitoring system for monitoring an interior compartment or cabin of the vehicle.

In one form, the plurality of optical elements comprises an outer optical element, an inner optical element and first and second intermediate optical elements positioned between said outer and inner optical elements. The inner optical element is positioned toward the imaging plane and the outer optical element is positioned toward the scene being focused by the optical system.

According to another aspect of the present invention, an optical system for use with an imaging system of a vehicle includes a plurality of optical elements comprising an outer optical element, an inner optical element and first and second intermediate optical elements positioned between the outer and inner optical elements. The outer optical element is positioned toward a scene or targeted area being focused by the optical system. The first intermediate optical element is positioned between the outer optical element and the second intermediate optical element, while the second intermediate optical element is positioned between the first intermediate optical element and the inner optical element. The plurality of optical elements comprise less than five optical elements. Each of the plurality of optical elements comprises a plastic material. At least two of the plurality of optical elements have a diffractive element formed at a surface thereof. The optical system provides a field of view of at least approximately 100 degrees to an image plane at the inner optical element.

Preferably, the outer optical element comprises a clear aperture diameter of less than approximately 15 mm. Preferably, the optical system includes an aperture stop positioned between the second intermediate optical element and the inner optical element.

In one form, a diffractive element is formed at a surface of the second intermediate optical element and at a surface of the inner optical element. The diffractive elements are preferably formed on surfaces of the second intermediate optical element and the inner optical element facing toward the scene or targeted area that is being focused by the optical system.

Therefore, the present invention provides a lens system which includes all plastic optics or elements with two diffractive elements or surfaces. The present invention provides a wide angle focusing lens system which includes only four optics or elements, rather than the six to ten glass element lenses of conventional lens systems. By using only plastic elements, large scale fabrication is quicker and less expensive than fabrication of glass lenses. Additionally, the use of plastic optical elements provides for easy, economical addition of mounting features to the optics or the lens system to fit the particular application for the lens system. Also, by providing a lens system having only four optics, the lens system of the present invention may be more compact than lenses of the prior art.

These and other objects, advantages, purposes and features of this invention will become apparent upon review of the following specification in conjunction with the drawings.

DESCRIPTION OF THE PREFERRED EMBODIMENTS

Figures 1, 3:
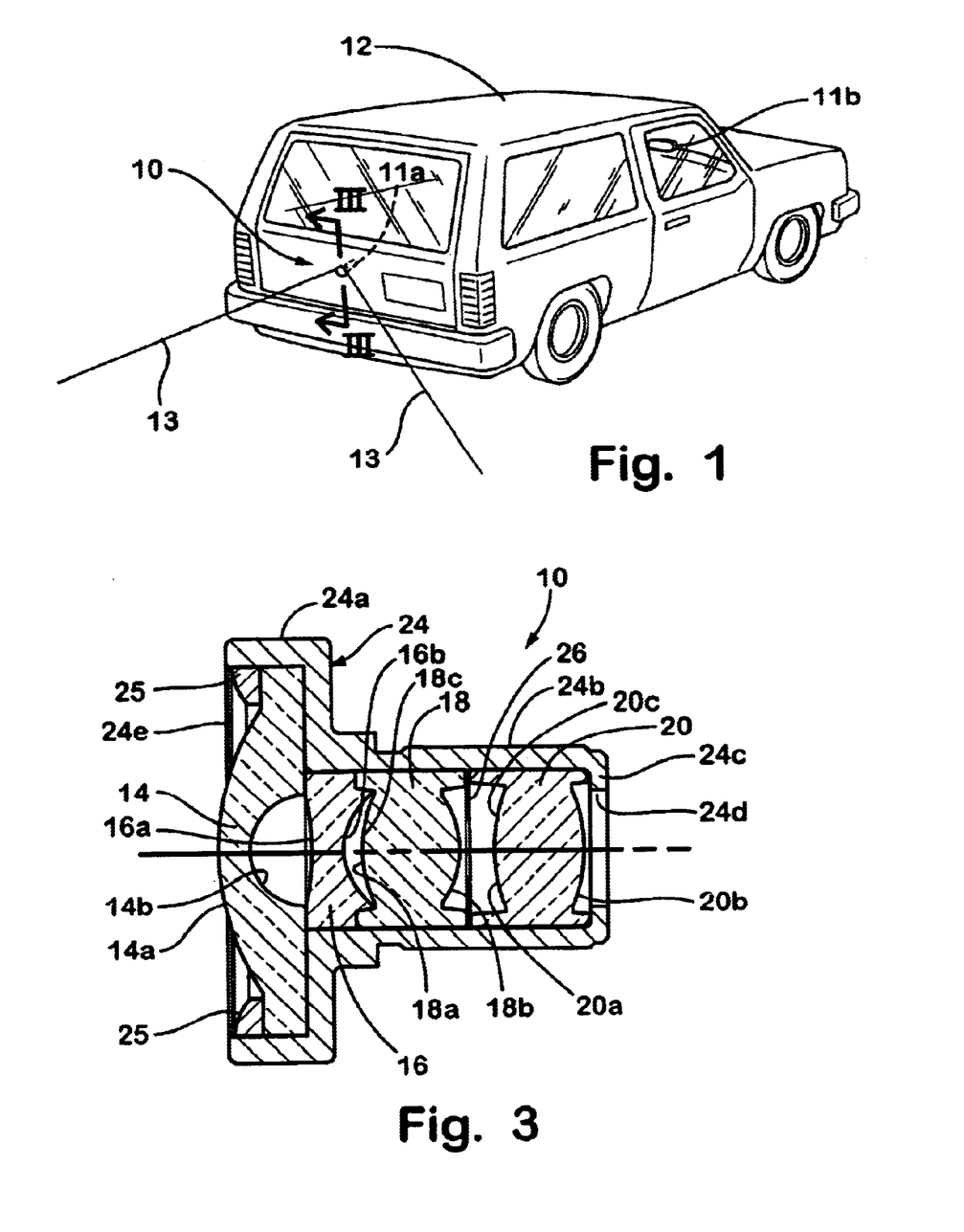
FIG. 1 is a rear perspective view of a vehicle including an optical system in accordance with the present invention, as implemented with a rear vision system of the vehicle.
FIG. 3 is a cross sectional view of the optical system taken along the line III—III in FIG. 1.

Referring now to the drawings and the illustrative embodiments depicted therein, an optical system 10 is suitable for use with a vehicular imaging or video system 11 of a vehicle 12 (FIG. 1). For example, as shown in FIG. 1, optical system 10 may be implemented with an imaging device, such as a camera or imaging array sensor or the like, as part of a rear-vision system of a vehicle which is operable to provide a view of the area 13 rearward of the vehicle to an occupant of the vehicle. Examples of such rear vision systems are disclosed in U.S. Pat. Nos. 5,550,677; 5,670,935 and 6,201,642, and U.S. patent applications, Ser. No. 09/767,939, filed Jan. 23, 2001 by Brent J. Bos for WIDE ANGLE IMAGING SYSTEM, now U.S. Pat. No. 6,590,719 (Attorney Docket DON08 P-871), and Ser. No. 09/199,907, filed Nov. 25, 1998 by Brent J. Bos et al. for WIDE ANGLE IMAGE CAPTURE SYSTEM FOR VEHICLE (Attorney Docket DON01 P-676), which are hereby incorporated by reference herein. As the image is received by an imaging device or image capture device 11a, the image may be electronically communicated to a display screen 11b located within the vehicle 12, where the image may be displayed for the vehicle operator. Alternately, an output of the image capture device may be provided to a control (not shown) for controlling an accessory of vehicle 12, such as headlamps, windshield wipers or the like. For example, optical system 10 may be implemented in other imaging or video systems of a vehicle, such as a rain sensor, such as disclosed in U.S. Pat. No. 6,313,454 (Attorney Docket DON01 P-745); and/or in U.S. pat. applications, Ser. No. 09/530,306, filed Apr. 27, 2000. now U.S. Pat. No. 6,353,392 (Attorney Docket DON01 P-708A); Ser. No. 09/599,979, filed Jun. 22, 2000, now U.S. Pat. No. 6,320,176 (Attorney Docket DON01 P-816); and/or Ser. No. 10/011,517, filed Nov. 5, 2001 for RAIN SENSOR INTERIOR REARVIEW MIRROR SYSTEM INCLUDING A FORWARD FACING VIDEO DEVICE (Attorney Docket DON01 P-934), a headlamp control, such as disclosed in U.S. Pat. Nos. 6,320,176; 6,097,023 and 5,796,094, an interior video or interior monitoring system, such as disclosed in U.S. patent application, Ser. No. 09/793,002, filed Feb. 26, 2001 by Schofield et al. for VIDEO MIRROR SYSTEMS INCORPORATING AN ACCESSORY MODULE (Attorney Docket DON01 P-869), which are all hereby incorporated herein by reference, or the like.

Figure 2:
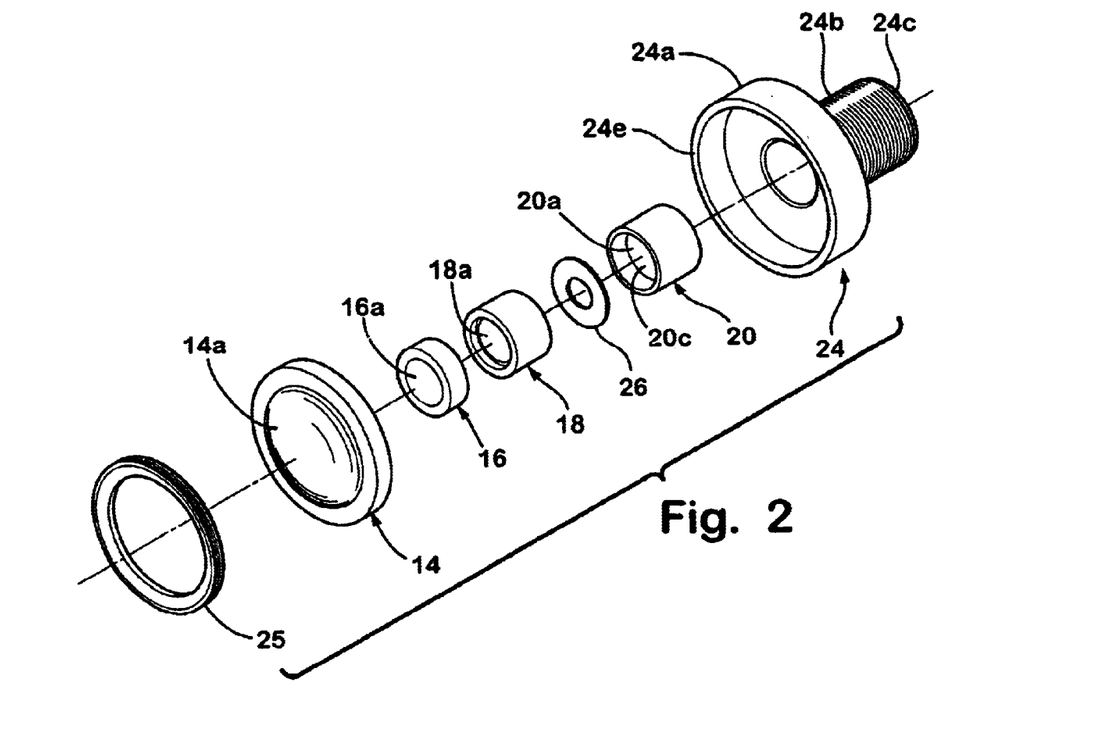
FIG. 2 is an exploded perspective view of an optical system in accordance with the present invention.
Figure 4:
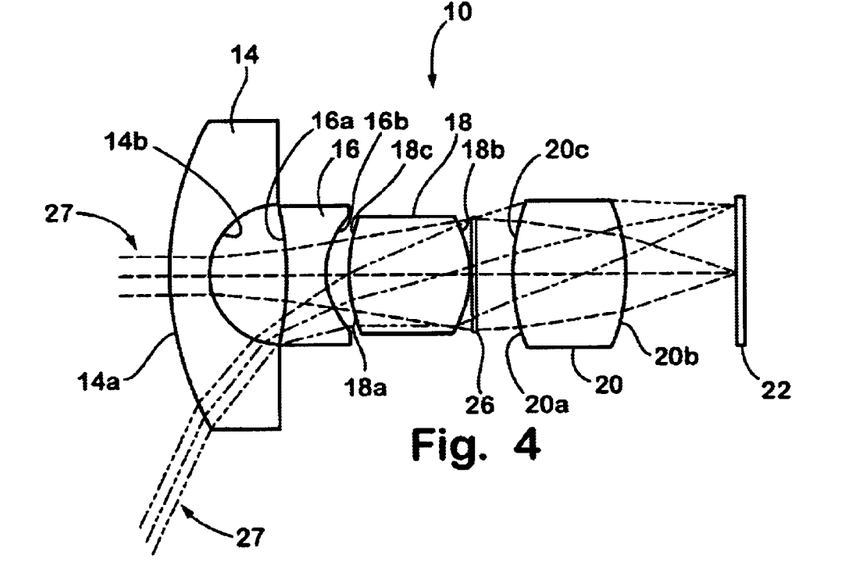
FIG. 4 is a schematic layout of an optical system in accordance with the present invention.

As shown in FIGS. 2–4, optical system 10 comprises only four optical elements or lenses: an outer optical element 14, which is positioned toward the scene being focused by optical system 10, a pair of intermediate or middle optical elements 16 and 18, and an inner optical element 20, which is positioned toward an imaging plane 22, which is at the sensor or camera that the image is being focused onto by optical system 10. Each optical element 14, 16, 18, 20 is formed of a plastic material, such as acrylic, polycarbonate or the like. In applications where optical system 10 is implemented with an exteriorly directed imaging system, outer optical element may be positioned at an exterior portion of the vehicle, while inner optical element 20 and imaging plane 22 are positioned at an interior portion of the vehicle or within a panel or compartment of the vehicle, similar to the imaging systems disclosed in U.S. Pat. No. 6,201,642 and U.S. patent applications, Ser. No. 09/767,939, filed Jan. 23, 2001 by Brent J. Bos for WIDE ANGLE IMAGING SYSTEMS now U.S. Pat. No. 6,590,719 (Attorney Docket DON08 P-871), and Ser. No. 09/199,907, filed Nov. 25, 1998 by Brent J. Bos et al. for WIDE ANGLE IMAGE CAPTURE SYSTEM FOR VEHICLE (Attorney Docket DON01 P-676), which are hereby incorporated by reference herein.

As shown in FIGS. 2 and 3, the plastic optical elements 14, 16, 18, 20 may be mounted within a generally barrel-shaped housing 24, which then may be mounted at a camera or sensor and positioned at an appropriate location at or in a vehicle, such as at a rearward portion of a vehicle for a rear-vision system or the like. Housing 24 is a generally cylindrical housing with portions 24a, 24b of different diameters. Cylindrical portion 24a has a larger diameter portion for housing outer optical element 14, while cylindrical portion 24b has a smaller diameter portion for housing the intermediate optical elements 16, 18 and inner optical element 20. An inner end 24c of cylindrical portion 24b includes an aperture 24d for the image focused by optical elements 14, 16, 18, 20 to pass through to the imaging plane 22 (FIG. 4). A cover or cap 25 is positioned at an outer end 24e of larger cylindrical portion 24a to secure and contain outer optical element 14 within housing 24. When assembled, optical system 10 is a compact lens system which may be mounted in a desired location at or in the vehicle and generally adjacent to an imaging device. Preferably, housing 24 also comprises a plastic material and may be molded to be configured for mounting with the particular vision system and area of the vehicle.

The optical system 10 of the present invention provides a field of view of at least approximately 100 degrees and directs the image onto imaging plane 22, which is at the imaging device, such as a camera, sensor, such as a pixelated image array sensor, or the like. The sensor or imaging device then receives the focused image from the optical system. In a preferred embodiment, the optical system 10 is adapted to be used with a ⅓ inch detector format or larger. However, the design of the optical elements may be linearly scaled to accommodate other detector formats without affecting the scope of the present invention. Although various camera devices may be utilized, the sensor may comprise a pixelated-imaging array. An example of such an imaging array is a CMOS imaging array or the like, a detailed description of which is disclosed in U.S. Pat. Nos. 5,550,677 and 5,670,935, issued to Schofield et al., which are hereby incorporated herein by reference. However, other devices such as a CCD or a MOS may also be used. The preferred image capture device is thus a low cost camera device, yet still provides an effective means for receiving the image.

As best shown in FIGS. 3 and 4, each optical element 14, 16, 18, 20 includes opposite facing curved surfaces 14a, 14b, 16a, 16b, 18a, 18b, 20a, 20b. In the illustrated embodiment, two of the acrylic optical elements 18, 20 include a diffractive element 18c, 20c, such as a diffractive grating or a diffractive surface, on or adjacent to one of their curved surfaces 18a, 20a, respectively. The diffractive elements correct for color in the refracted virtual image, including spherochromatism and chromatic aberrations generated as the image is refracted through the optical elements 18, 20. The optical elements may further include one or more aspheric curved surfaces to aid in the correction of other system aberrations. The plastic composition of the optical elements also facilitates forming the diffractive elements onto the surfaces in a cost-effective manner, since the diffractive pattern may be molded onto the surface as the optic element is formed. For example, the diffractive elements may be formed by using the principles disclosed in commonly assigned U.S. Pat. No. 5,538,674, issued to Nisper, the disclosure of which is hereby incorporated herein by reference. This provides a low cost yet effective means to correct the color aberrations in the refracted image.

As best seen in FIGS. 3 and 4, each surface of optical elements 14, 16, 18, 20 is curved to refract the image through the optical elements. More particularly, in the illustrated embodiment, outer optical element 14 includes an outer positively curved or converging surface 14a and an inner positively curved or converging surface 14b. In a preferred embodiment, the outer curved surface 14a has a radius of curvature within a range of approximately 14.5 mm to 15.5 mm, more preferably approximately 14.9 to 15.1 mm, and most preferably at approximately 14.9846 mm, while inner curved surface 14b has a radius of curvature within a range of approximately 2.8 mm to 3.8 mm, more preferably approximately 3.1 to 3.5 mm, and most preferably at approximately 3.2998 mm. Outer surface 14a of optical element 14 has a clear aperture diameter of approximately 14 to 15 mm, more preferably approximately 14.4 to 14.7 mm, and most preferably at approximately 14.55 mm, while inner surface 14b has a clear aperture diameter of approximately 6 to 7.2 mm, more preferably approximately 6.4 to 6.8 mm, and most preferably at approximately 6.587 mm. Outer optical element 14, in conjunction with optical elements 16, 18 and 20, thus provides a wide angle field of view (of at least approximately 100 to 110 degrees) with a relatively small clear aperture diameter, and thus provides a compact, inexpensive, lightweight lens system capable of providing a wide angle view of a targeted area.

Intermediate optical element 16 is positioned generally adjacent to outer optical element 14 and includes an outer negatively curved or diverging surface 16a and an inner positively curved or converging surface 16b. In a preferred embodiment, the outer curved surface 16a has a radius of curvature within a range of approximately −22 mm to −24 mm, more preferably approximately −22.7 to −23.1 mm, and most preferably at approximately −22.8944 mm, and a clear aperture diameter of approximately 5.9 to 7 mm, more preferably approximately 6.3 to 6.6 mm, and most preferably at approximately 6.446 mm. Inner curved surface 16b has a radius of curvature within a range of approximately 3.3 mm to 4.3 mm, more preferably approximately 3.6 to 4 mm, and most preferably at approximately 3.7982 mm, and a clear aperture diameter of approximately 4.6 to 5.7 mm, more preferably approximately 5 to 5.3 mm, and most preferably at approximately 5.15 mm.

Intermediate optical element 18 is positioned generally adjacent intermediate optical element 16 and includes an outer positively curved or converging surface 18a and an inner negatively curved or diverging surface 18b. In a preferred embodiment, the outer curved surface 18a has a radius of curvature within a range of approximately 7.1 mm to 8.2 mm, more preferably approximately 7.5 to 7.8 mm, and most preferably at approximately 7.6645 mm, and includes diffractive element 18c. Outer curved surface 18a also has a clear aperture diameter of approximately 4.8 to 5.8 mm, more preferably approximately 5.1 to 5.5 mm, and most preferably at approximately 5.3 mm. Inner curved surface 18b has a radius of curvature within a range of approximately −4.4 mm to −5.4 mm, more preferably approximately −4.7 to −5.1 mm, and most preferably at approximately −4.8704 mm, and a clear aperture diameter of approximately 4.6 to 5.7 mm, more preferably approximately 5.0 to 5.3 mm, and most preferably at approximately 5.15 mm.

Additionally, inner optical element 20 includes an outer positively curved or converging surface 20a and an inner negatively curved or diverging surface 20b. In a preferred embodiment, the outer curved surface 20a has a radius of curvature within a range of approximately 7.3 mm to 8.3 mm, more preferably approximately 7.6 to 8.0 mm, and most preferably at approximately 7.7944 mm, and includes diffractive element 20c. Outer surface 20a has a clear aperture diameter of approximately 5.8 to 7 mm, more preferably approximately 6.2 to 6.6 mm, and most preferably at approximately 6.37 mm. Inner negatively curved surface 20b has a radius of curvature within a range of approximately −8.5 mm to −9.5 mm, more preferably approximately −8.9 to −9.2 mm, and most preferably at approximately −9.0324 mm, and a clear aperture diameter of approximately 6.5 to 7.5 mm, more preferably approximately 6.9 to 7.2 mm, and most preferably at approximately 7.05 mm.

As also seen in FIGS. 2–4, an aperture stop 26 is positioned between intermediate optical element 18 and inner optical element 20. Aperture stop 26 provides an opening for the light rays to pass through and is preferably between approximately 1.0mm and 5.0 mm in diameter, and more preferably at approximately 4.5 mm. Aperture stop 26 functions to restrict the amount of light rays 27 (FIG. 4), which represent the image to be received by the imaging device, which pass from intermediate optical element 18 to inner optical element 20. By providing a wider aperture, the image brightness and definition may be increased, while the depth of field and contrast of the image are correspondingly decreased. The aperture size may be selected according to the specific application and desired output of the imaging system associated with optical system 10. Furthermore, the precise location of aperture stop 26 may be adjusted according to the specific application and desired output. Optionally, aperture stop 26 may be an electrochromic aperture of the type disclosed in U.S. patent application, Ser. No. 09/493,522, filed Jan. 28, 2000 by Brent J. Bos et al. for ELECTRO-OPTIC APERTURE FOR VEHICULAR IMAGING SYSTEM. now U.S. Pat. No. 6.426.492 (Attorney Docket DON01 P-788), or a non-circular aperture stop of the type disclosed in U.S. patent application, Ser. No. 09/799,993, filed Mar. 6, 2001 by Brent J. Bos for NON-CIRCULAR APERTURE STOP, now U.S. Pat. No. 6,538,827 (Attorney Docket DON01 P-877), which are hereby incorporated herein by reference.

Because outer optical element 14 may be positioned toward an exterior of the vehicle 12, such that outer surface 14a may be exposed to the elements outside of vehicle 12, outer surface 14a may be coated with a protective coating to protect outer optical element 14 from deterioration or damage due to exposure to the elements. This protective coating preferably comprises an organic hard coat, an inorganic hard coat, or an organic/inorganic compound. Additionally, the protective coating may include ultra violet absorbers or stabilizers to protect outer optical element 14 from UV radiation degradation. This coating or other additional coatings substantially reduces the susceptibility of the optic to abrasion and/or ultra violet degradation, thereby providing a substantially clear and durable glass-like appearance to outer optical element 14. Preferably, the coating is of the type disclosed in commonly assigned EPC Application No. 98650039.5 for VEHICULAR COMPONENT ASSEMBLY WITH HARD COATED ELEMENT, published on Jan. 20, 1999 under Publication No. EP 0892209, the disclosure of which is hereby incorporated herein by reference. Outer optical element 14 may also be heatable to defog or defrost its surfaces. Outer optical element 14 may therefore be formed by a plastic and coated with an indium tin oxide (ITO) transparent conductor or a doped tin oxide, or may include a wire mesh or a conductive coating mesh. Furthermore, outer surface 14a may be coated with an anti-soiling or anti-wetting coating, such as a silicone material, which may provide either a hydrophobic or hydrophilic property to the optical element.

Therefore, the optical system of the present invention is suitable for use with a vehicular imaging or vision system and comprises fewer components than a conventional lens system, thus facilitating compact packaging of the system. This results in a low-cost and light-weight system having only a minimal number of components, none of which are expensive glass lenses or the like, yet still providing a moderate to wide angle field of view to a vehicle operator. In particular, diffractive elements are included to provide optimal focusing of the colors onto the imaging plane. Additionally, one or more of the optical elements of the present invention may include an aspheric, refractive surface to also correct for some of the distortion in the image before it is received by an imaging device at the imaging plane. These corrective elements also minimize other aberrations within the image, such as coma and astigmatism.

The optical system or lens system of the present invention is thus adapted to provide an image, such as a rearward or exteriorly directed image with respect to a vehicle, and may be implemented with a sensor and a display similar to the wide angle image capture systems disclosed in commonly assigned U.S. Pat. No. 6,201,642 and U.S. patent applications, Ser. No. 09/199,907, filed Nov. 25, 1998 by Brent J. Bos et al. (Attorney Docket DON01 P-676) and Ser. No. 09/767,939, filed Jan. 23, 2001 by Brent J. Bos, now U.S. Pat. No. 6,590,719 (Attorney Docket DON01 P-871), the disclosures of which are hereby incorporated herein by reference. The present invention may be implemented in other vehicular vision systems as well, such as rain sensors, such as the type disclosed in commonly assigned U.S. Pat. Nos. 6,313,454 and/or 5,320,176 and/or U.S. patent application, Ser. No. 09/530,306, filed Apr. 27, 2000, now U.S. Pat. No. 6,353,392 (Attorney Docket DON01 P-708A), the disclosures of which are hereby incorporated herein by reference, vehicle headlamp dimmer controls, such as the type disclosed in commonly assigned U.S. Pat. No. 5,796,094, issued to Schofield et al., the disclosure of which is hereby incorporated herein by reference, or other vision systems, backup cameras, stereo cameras, such as disclosed in U.S. patent application, Ser. No. 09/372,915, filed Aug. 12, 1999 by Brent J. Bos et al. for VEHICLE IMAGING SYSTEM WITH STEREO IMAGING, now U.S. Pat. No. 6,396,397 (Attorney Docket DON08 P-742), which is hereby incorporated herein by reference, interior monitor cameras, such as disclosed in U.S. patent application, Ser. No. 09/793,002, filed Feb. 26, 2001 by Schofield et al. for VIDEO MIRROR SYSTEMS INCORPORATING AN ACCESSORY MODULE (Attorney Docket DON01 P-869), which is hereby incorporated herein by reference, and/or the like.

Because the optical elements of the optical system of the present invention are preferably formed from polycarbonate and/or acrylic materials, the diffractive elements and other surface curvatures may be easily and inexpensively formed in the molding processes, thereby allowing the imaging system to be inexpensively manufactured with a minimal number of optic elements, in contrast to the ten or more expensive glass or precision optic elements required in conventional systems. Also, the design of the optical system of the present invention provides an outer optical element which has a small clear aperture diameter relative to the diameter of current lenses, which further minimizes the size of the optical system and enhances packaging of the system. Additionally, the size of the optical elements is selected to provide an appropriate thickness for each element, such that sinks (flaws in the plastic elements where a portion of the lens surface may dramatically depart from the original design intent, which may occur if they are designed to have too great a thickness) or streaking, birefringence or material under-fill (flaws in the plastic elements which may occur if they are designed to be too thin) are substantially precluded.

The optical system of the present invention therefore provides a low cost system for providing and focusing information surrounding the vehicle, such as rearward scenic information of an area directly rearward of the vehicle, which requires fewer components than commercially available systems requiring ten or more precision optic elements. Furthermore, the components of the present invention are inexpensive and robust elements, thus further reducing the costs relative to conventional systems, while increasing the durability of the imaging system. An additional benefit is that the low cost plastic lens system of the present invention also reduces the overall weight of the imaging system relative to the substantially heavier conventional glass systems.

Changes and modifications in the specifically described embodiments can be carried out without departing from the principles of the invention, which is intended to be limited only by the scope of the appended claims, as interpreted according to the principles of patent law.

What is claimed is:

1. An optical system for use with an imaging system of a vehicle, said optical system comprising:
    a plurality of optical elements, said plurality of optical elements comprising less than five optical elements, at least one of said plurality of optical elements comprising a plastic material, said at least one of said plurality of optical elements having an outer surface positioned toward an exterior of the vehicle and exposed outside of the vehicle when said optical system is positioned at the vehicle, said outer surface having at least one of (a) a protective coating to protect said outer surface from deterioration or damage due to exposure outside of the vehicle, (b) a conductive coating adapted for heating to defog or defrost said outer surface, (c) a wire mesh coating adapted for heating to defog or defrost said outer surface, and (d) an anti-wetting coating to provide at least one of a hydrophobic property and a hydrophilic property to said outer surface, said optical system providing a field of view of at least approximately 100 degrees to an imaging plane; and
    a sensor positioned at said imaging plane, said plurality of optical elements providing a field of view to said sensor, said sensor being operable to generate an output indicative of an image of the field of view, said sensor comprising a component of a vehicular vision system for providing scenic information of an area exteriorly of the vehicle to an occupant of the vehicle, wherein said plurality of optical elements comprises an outer optical element, an inner optical element and first and second intermediate optical elements positioned between said outer and inner optical elements, said inner optical elements being at an end of said optical system toward said imaging plane, wherein said inner optical element comprises an outer positively curved surface and an inner negatively curved surface.

2. The optical system of claim 1, wherein one surface of two of said plurality of optical elements includes a diffractive element.

3. The optical system of claim 1, wherein said sensor comprises a component of the vehicular vision system for providing scenic information of an area exteriorly of the vehicle to at least one of a backup camera, and a stereo imaging system.

4. The optical system claim 1, wherein said outer optical element comprises a clear aperture diameter of less than approximately 15 mm.

5. The optical system of claim 1 further including an aperture stop.

6. The optical system of claim 1, wherein a diffractive element is formed on said at least two of said plurality of optical elements.

7. The optical system of claim 1, wherein said plurality of optical elements comprises four optical elements.

8. The optical system of claim 4, wherein said outer optical element comprises said outer surface and an inner surface, said outer and inner surfaces being positively curved.

9. The optical system of claim 5, wherein said aperture stop is positioned between said second intermediate optical element and said inner optical element.

10. The optical system of claim 6, wherein said at least two of said plurality of optical elements comprise said second intermediate optical element and said inner optical element.

11. The optical system of claim 8, wherein said outer surface has a radius of curvature which is greater than a radius of curvature of said inner surface.

12. The optical system of claim 8, wherein said first intermediate optical element is positioned adjacent said outer optical element and said second intermediate optical element is positioned between said first intermediate optical element and said inner optical element.

13. The optical system of claim 12, wherein said first intermediate optical element has an outer negatively curved surface and an inner positively curved surface, said outer negatively curved surface facing said inner surface of said outer optical element.

14. The optical system of claim 13, wherein said second intermediate optical element has an outer positively curved surface and an inner negatively curved surface, said outer positively curved surface of said second intermediate optical element facing said inner positively curved surface of said first intermediate optical element.

15. The optical system of claim 14, wherein said outer positively curved surface of said second intermediate optical element comprises a diffractive element.

16. The optical system of claim 10, wherein said diffractive element is formed on outer surfaces of said second intermediate optical element and said inner optical element, said outer surfaces facing toward said outer optical element.

17. An optical system for use with an imaging system of a vehicle, said optical system comprising:
    a plurality of optical elements, said plurality of optical elements comprising less than five optical elements, each of said plurality of optical elements comprising a plastic material, at least two of said plurality of optical elements comprising a diffractive element, said optical system providing a field of view of at least approximately 100 degrees to an imaging plane, said plurality of optical elements comprising an outer optical element, an inner optical element and first and second intermediate optical elements positioned between said outer and inner optical elements, said inner optical element being at an end of said optical system toward said imaging plane, said outer optical element comprising a clear aperture diameter of less than approximately 15 mm, said outer optical element comprising an outer surface and an inner surface, said outer and inner surfaces being positively curved, said outer surface having a radius of curvature which is greater than a radius of curvature of said inner surface, wherein said outer surface of said outer optical element has a radius of curvature of approximately 15 mm and said inner surface of said outer optical element has a radius of curvature in the range of approximately 2.8 to 3.8 mm.

18. An optical system for use with an imaging system of a vehicle, said optical system comprising:
    a plurality of optical elements, said plurality of optical elements comprising less than five optical elements, each of said plurality of optical elements comprising a plastic material, at least two of said plurality of optical elements comprising a diffractive element, said optical system providing a field of view of at least approximately 100 degrees to an imaging plane, said plurality of optical elements comprising an outer optical element, an inner optical element and first and second intermediate optical elements positioned between said outer and inner optical elements, said inner optical element being at an end of said optical system toward said imaging plane, said outer optical element comprising a clear aperture diameter of less than approximately 15 mm, said outer optical element comprising an outer surface and an inner surface, said outer and inner surfaces being positively curved, said first intermediate optical element being positioned adjacent to said outer optical element and said second intermediate optical element being positioned between said first intermediate optical element and said inner optical element, said first intermediate optical element having an outer negatively curved surface and an inner positively curved surface, said outer negatively curved surface facing said inner surface of said outer optical element, wherein said outer negatively curved surface has a radius of curvature of approximately −23 mm and said inner positively curved surface of said first intermediate optical element has a radius of curvature of approximately 3.5 to 4.1 mm.

19. An optical system for use with an imaging system of a vehicle, said optical system comprising:

a plurality of optical elements, said plurality of optical elements comprising less than five optical elements, each of said plurality of optical elements comprising a plastic material, at least two of said plurality of optical elements comprising a diffractive element, said optical system providing a field of view of at least approximately 100 degrees to an imaging plane, said plurality of optical elements comprising an outer optical element, an inner optical element and first and second intermediate optical elements positioned between said outer and inner optical elements, said inner optical element being at an end of said optical system toward said imaging plane, said outer optical element comprising a clear aperture diameter of less than approximately 15 mm, said outer optical element comprising an outer surface and an inner surface, said outer and inner surfaces being positively curved, said first intermediate optical element being positioned adjacent to said outer optical element and said second intermediate optical element being positioned between said first intermediate optical element and said inner optical element, said first intermediate optical element having an outer negatively curved surface and an inner positively curved surface, said outer negatively curved surface facing said inner surface of said outer optical element, said second intermediate optical element having an outer positively curved surface and an inner negatively curved surface, said outer positively curved surface of said second intermediate optical element facing said inner positively curved surface of said first intermediate optical element, wherein said outer positively curved surface of said second intermediate optical element has a radius of curvature in the range of approximately 7 to 8 mm and said inner negatively curved surface has a radius of curvature of approximately −4.4 to −5.4 mm.

20. An optical system for use with an imaging system of a vehicle, said optical system comprising:

a plurality of optical elements, said plurality of optical elements comprising less than five optical elements, each of said plurality of optical elements comprising a plastic material, at least two of said plurality of optical elements comprising a diffractive element, said optical system providing a field of view of at least approximately 100 degrees to an imaging plane, said plurality of optical elements comprising an outer optical element, an inner optical element and first and second intermediate optical elements positioned between said outer and inner optical elements, said inner optical element being at an end of said optical system toward said imaging plane, said outer optical element comprising a clear aperture diameter of less than approximately 15 mm, said outer optical element comprising an outer surface and an inner surface, said outer and inner surfaces being positively curved, said first intermediate optical element being positioned adjacent to said outer optical element and said second intermediate optical element being positioned between said first intermediate optical element and said inner optical element, said first intermediate optical element having an outer negatively curved surface and an inner positively curved surface, said outer negatively curved surface facing said inner surface of said outer optical element, said second intermediate optical element having an outer positively curved surface and an inner negatively curved surface, said outer positively curved surface of said second intermediate optical element facing said inner positively curved surface of said first intermediate optical element, wherein said inner optical element comprises an outer positively curved surface and an inner negatively curved surface.

21. The optical system of claim 20, wherein said second outer positively curved surface of said inner optical element comprises a diffractive element.

22. The optical system of claim 20, wherein said outer positively curved surface of said inner optical element has a radius of curvature in the range of approximately 7 to 8 mm and said inner negatively curved surface of said inner optical element has a radius of curvature of approximately −9 mm.

23. An optical system for use with an imaging system of a vehicle, said optical system comprising:

a plurality of optical elements comprising an outer optical element, an inner optical element and first and second intermediate optical elements positioned between said outer and inner optical elements, said outer optical element being positioned at an end of said optical system toward a targeted scene, said first intermediate optical element being positioned between said outer optical element and said second intermediate optical element, said second intermediate optical element being positioned between said first intermediate optical element and said inner optical element, said plurality of optical elements comprising less than five optical elements, each of said plurality of optical elements comprising a plastic material, at least two of said plurality of optical elements having a diffractive element formed at a surface thereof, said outer optical element having an outer surface positioned toward an exterior of the vehicle and exposed outside of the vehicle, said outer surface having at least one of (a) a protective coating to protect said outer surface from deterioration or damage due to exposure outside of the vehicle, (b) a conductive coating adapted for heating to defog or defrost said outer surface, (c) a wire mesh coating adapted for heating to defog or defrost said outer surface, and (d) an anti-wetting coating to provide at least one of a hydrophobic property and a hydrophilic property to said outer surface, said optical system providing a field of view of the targeted scene of at least approximately 100 degrees to an image plane at said inner optical element; and a sensor positioned at said imaging plane, said plurality of optical elements providing a field of view to said sensor, said sensor being operable to generate an output indicative of an image of the field of view, said sensor comprising a component of a vehicular vision system for providing scenic information of an area exteriorly of a vehicle to at least one of an occupant of the vehicle, a backup camera and a stereo imaging system.

24. The optical system of claim 23, wherein said outer optical element comprise a clear aperture diameter of less than approximately 15 mm.

25. The optical system of claim 23 further including an aperture stop.

26. The optical system of claim 23, wherein said diffractive element is formed at a surface of said second intermediate optical element and at a surface of said inner optical element.

27. The optical system of claim 25, wherein said aperture stop is positioned between said second intermediate optical element and said inner optical element.

28. The optical system of claim 26, wherein said diffractive element is formed on outer surfaces of said second intermediate optical element and said inner optical element, said outer surfaces facing toward said outer optical element.

* * * * *

UNITED STATES PATENT AND TRADEMARK OFFICE
CERTIFICATE OF CORRECTION

PATENT NO. : 6,757,109 B2  
APPLICATION NO. : 10/010862  
DATED : June 29, 2004  
INVENTOR(S) : Brent J. Bos Page 1 of 1

It is certified that error appears in the above-identified patent and that said Letters Patent is hereby corrected as shown below:

Column 4  
Line 25, delete "RAIN SENSOR"

Column 12  
Claim 23, Line 56, insert --, wherein said inner optical element comprises an outer positively curved surface and an inner negatively curved surface,-- after "optical element,"

Column 13  
Claim 23, Line 9, "image" should be --imaging--

Signed and Sealed this

Thirtieth Day of December, 2008

JON W. DUDAS  
*Director of the United States Patent and Trademark Office*